United States Patent
Frei

(10) Patent No.: US 8,005,310 B2
(45) Date of Patent: Aug. 23, 2011

(54) METHOD AND DEVICE FOR INTERPOLATION AND CORRECTION OF AN IMAGE

(75) Inventor: Bernhard Frei, Constance (DE)

(73) Assignee: Oce Printing Systems GmbH, Poing (DE)

( * ) Notice: Subject to any disclaimer, the term of this patent is extended or adjusted under 35 U.S.C. 154(b) by 963 days.

(21) Appl. No.: 11/579,293

(22) PCT Filed: May 19, 2005

(86) PCT No.: PCT/EP2005/005459
§ 371 (c)(1),
(2), (4) Date: Nov. 1, 2007

(87) PCT Pub. No.: WO2005/114573
PCT Pub. Date: Dec. 1, 2005

(65) Prior Publication Data
US 2008/0151308 A1  Jun. 26, 2008

(30) Foreign Application Priority Data
May 19, 2004  (DE) .......................... 10 2004 024 855

(51) Int. Cl.
G06K 9/40 (2006.01)
G06K 9/32 (2006.01)
G06T 5/00 (2006.01)
(52) U.S. Cl. ........................ 382/260; 382/300; 358/3.26
(58) Field of Classification Search .................. 382/260, 382/254, 274, 300; 358/3.26, 428, 518, 525; 348/538; 345/606
See application file for complete search history.

(56) References Cited

U.S. PATENT DOCUMENTS

| | | | |
|---|---|---|---|
| 5,301,255 A | 4/1994 | Nagai et al. | |
| 5,301,266 A | 4/1994 | Kimura | |
| 5,880,767 A | 3/1999 | Liu | |
| 6,493,467 B1 * | 12/2002 | Okuda et al. | 382/260 |
| 6,501,484 B1 | 12/2002 | Porter | |
| 6,714,688 B1 | 3/2004 | Gallagher et al. | |
| 6,847,737 B1 * | 1/2005 | Kouri et al. | 382/260 |
| 6,933,970 B2 * | 8/2005 | Koshiba et al. | 348/273 |
| 7,437,013 B2 * | 10/2008 | Anderson | 382/261 |

FOREIGN PATENT DOCUMENTS

| | | |
|---|---|---|
| EP | 0 450 335 | 10/1991 |
| EP | 1 041 510 | 10/2000 |
| JP | 03040179 A | 2/1991 |
| JP | 04307886 A | 10/1992 |
| JP | 04330858 A | 11/1992 |

(Continued)

OTHER PUBLICATIONS

Digitale Bildverarbeitung—Nachbarschaftsoperatoren 4.1 Verknüpfung von Bildpunkten Feb. 1997.

(Continued)

*Primary Examiner* — Yon Couso
(74) *Attorney, Agent, or Firm* — Schiff Hardin LLP

(57) ABSTRACT

In a method or device for interpolation and correction of a digital image, the source image is mapped to a target image with a FIR filter that comprises a plurality of filter coefficients, the filter coefficients comprising both information for interpolation and information for correction of the image. Both the interpolation and the correction of the image are executed in a single step.

12 Claims, 8 Drawing Sheets

FOREIGN PATENT DOCUMENTS

| | | | |
|---|---|---|---|
| JP | 07095527 A | 4/1995 |
| JP | 11168653 | 6/1999 |
| JP | 2000310984 A | 11/2000 |

OTHER PUBLICATIONS

An Interpolation-Filtering Method for Noise-Corrupted Images Courmontagne etal—IEEE 1977.

Lexikon der Computergrafik und Bildverarbeitung 1994—Alfred Iwainsky et al.

Patent Abstracts of Japan 20003353241 Dec. 19, 2000.

XP-002330564 Math. Prgram., Ser. B 97:495-515 (2003)—Goldfarb et al Robust Convex Quadratically Constrained Programs.

* cited by examiner

| | $a_1$ | $a_2$ | $a_3$ | $a_4$ | $a_5$ | $a_6$ | $a_7$ |
|---|---|---|---|---|---|---|---|
| dx=0 | 0.0350059 | -0.133907 | 0.114973 | | 0.114973 | -0.133907 | 0.0350059 |
| dx=0,1d | 0.0300856 | -0.10213 | 0.0195517 | 1.00169 | 0.222762 | -0.162334 | 0.0374476 |
| dx=0,2d | 0.022561 | -0.0683933 | -0.0614095 | 0.988451 | 0.339675 | -0.185583 | 0.0378263 |
| dx=0,3d | 0.0148558 | -0.0367352 | -0.124963 | 0.949158 | 0.460843 | -0.199624 | 0.0330341 |
| dx=0,4d | 0.00549597 | -0.00732954 | -0.171306 | 0.886423 | 0.583599 | -0.20512 | 0.0269148 |
| dx=0,5d | -0.00127035 | 0.0157433 | -0.198729 | 0.8015790 | 0.700489 | -0.198444 | 0.0164267 |
| dx=0,6d | -0.00844709 | 0.0295587 | -0.202828 | 0.699618 | 0.806097 | -0.171542 | -0.0013068 |
| dx=0,7d | -0.0138489 | 0.040648 | -0.0197909 | 0.582302 | 0.896942 | -0.132917 | -0.0184879 |
| dx=0,8d | -0.0185713 | 0.0454763 | -0.178766 | 0.459407 | 0.959199 | -0.0655219 | -0.0474081 |
| dx=0,9d | -0.0285469 | 0.0601877 | -0.166051 | 0.339426 | 0.994026 | 0.0195351 | -0.0783591 |
| | | | | 0.233042 | | | |

Fig.3

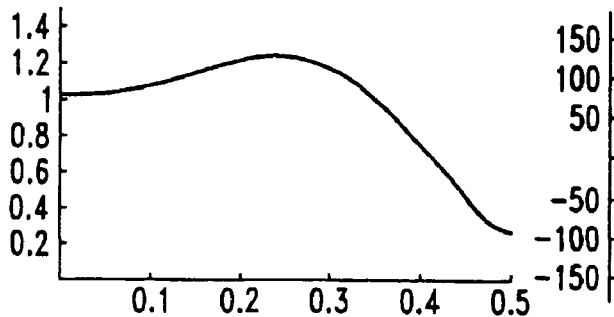
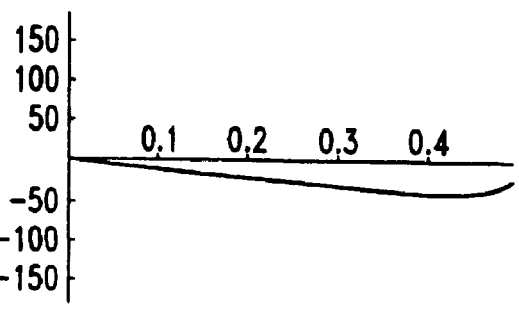
Fig.11a  Fig.11b
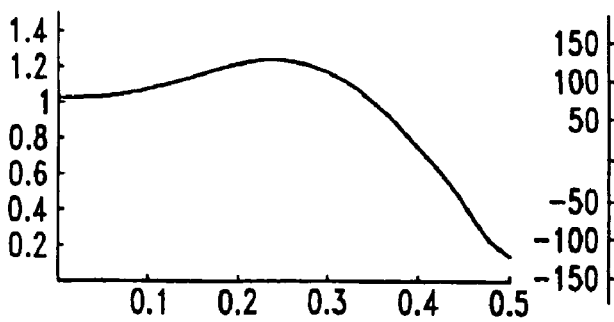
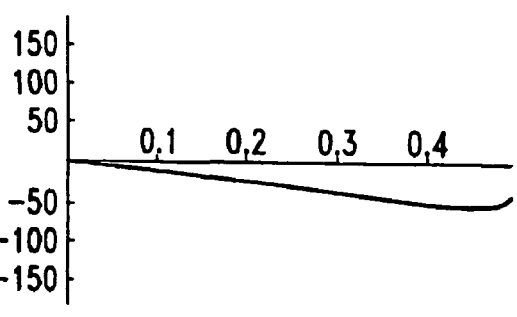
Fig.12a  Fig.12b
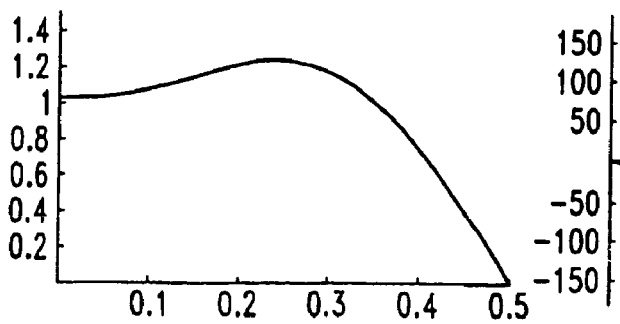
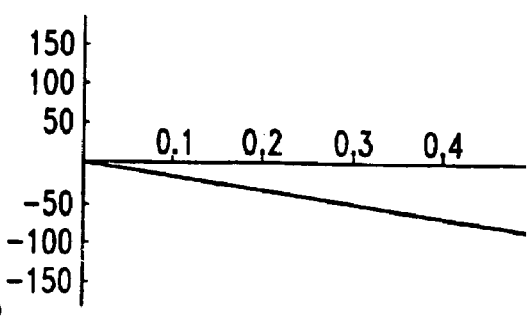
Fig.13a  Fig.13b

METHOD AND DEVICE FOR INTERPOLATION AND CORRECTION OF AN IMAGE

BACKGROUND

The preferred embodiment concerns a method and a device for interpolation and correction of an image.

Given a digital image present as a computer-readable file, the necessity often exists to provide the image in a different resolution than as it originally exists. This in particular applies given an image scanned in by means of a scanner, which image often should be output at a different resolution than as was acquired via the optic and the sensor of the scanner.

The optical imaging via the real optic (objective) onto a scanner is additionally connected with a series of shortcomings that are caused by the optic, the sensor, the subsequent analog amplifications and the non-ideal sampling. Given superior scanners these deviations are corrected with known methods. For correction of the image it is known to use FIR filters (FIR: Finite Impulse Response), IIR filters (IIR: Infinite Impulse Response) and non-linear filters such as pruning or median filters. Non-linear filter methods are less suitable for correction of the optical/electronic acquisition system than for correction of local disruptions such as, for example, scratches in the document.

The alteration of the resolution of an image is executed by means of interpolation methods. The interpolation methods used most frequently are bilinear interpolation, bi-quadratic interpolation and two-dimensional interpolation with B-splines.

In superior scanners an acquired image is initially transformed into the desired resolution by means of an interpolation and a correction of the image is subsequently implemented. The interpolation can hereby also be executed in a plurality of steps in order to, for example, initially equalize the image and then change the resolution.

The effect of conventional interpolation methods on an image in the depiction in frequency space is subsequently explained using FIGS. 4-7. An image is represented by oscillations along a line in frequency space. FIG. 4 shows the influence of the bilinear interpolation given a shift of dx=0.25 pixels, by which is meant ¼ of the interval between two pixels. The normalized spatial frequency is plotted on the abscissa up to the Nyquist limit (at 0.5). The Nyquist frequency is the spatial frequency that represents a line of successive black and white image points. One recognizes that the greater the spatial frequency, the more significantly that the amplitude decreases (FIG. 4). This means that, given the bilinear interpolation, fine contrasts (i.e. lines lying close to one another) are weakened given a shift of dx=0.25. A shift of dx=0.25 is, for example, frequently applied given the conversion of an image from 300 DPI to 233 DPI.

The phase curve over the normalized frequency is shown in FIG. 5 for a shift of dx=0.25. For an optimal interpolation function that should implement an image shift by a ¼ pixel, the phase shift via the frequency would have to yield a straight line that goes through the origin and has a value of 45° given the Nyquist frequency. This desired function is shown dashed in FIG. 5. The phase error amounts to 4.5° at half of the Nyquist limit (i.e. 2.5% relative to the pixel length) and then rises sharply up to the Nyquist limit.

FIGS. 6 and 7 show the corresponding diagrams for an interpolation of dx=0.5 pixels. From FIG. 6 one can learn that the amplitude is more strongly damped given an interpolation of dx=0.5 pixels. To the contrary, a phase error does not occur given this interpolation (FIG. 7).

Given a bi-quadratic interpolation or given a splines interpolation, the errors are less than given a bilinear interpolation. However, it applies for all conventional interpolation methods that amplitude and phase errors arise that are dependent on the magnitude of the shift. Since the necessary shift varies across the image for arbitrary interpolations, these errors are not spatially differently developed in the interpolated image.

From U.S. Pat. No. 5,301,266 a method arises in which an image is initially filtered in frequency space and the image is subsequently transferred into classical three-dimensional space in which an interpolation is executed.

A method and a system with which a signal should be processed, which signal should exhibit an interference in the range of its high-frequency components, arises from EP 1 041 510 A2. Such interferences are in particular caused given a linear interpolation. Small 2-dimensional FIR filters are used for correction of such interferences (in particular given the processing of images), in particular inverse filters that correct a lowpass characteristic caused by the interpolation. Different filters that are calculated in advance and stored in filter banks are used for the individual interpolation steps. Each such filter corrects the interference in the frequency response that has been caused by the preceding interpolation.

These known methods for changing the resolution and correction of a digital image are not in the position to compensate these errors with high quality since the information necessary for this is no longer available after an interpolation step. Since the interpolation errors are very extensive per region, the conventional methods exhibit significant deficiencies that cannot be corrected.

A method for simultaneous interpolation and filtering of images arises from COURMONTAGEN, P.; CAVASSILAS, J. F.; "An interpolation-filtering method for noise-corrupted images" from Digital Signal Processing, 1997, Volume 2, page 1091-1094. The image is hereby transformed in frequency space by means of a Fourier transformation. Both the filtering and the interpolation can be respectively executed in frequency space via a multiplicative operation, such that both operations (the filtering and the interpolation) can be executed simultaneously. However, since this operation is located in frequency space, these operations must respectively be executed across the entire image. Given images with an image size of 256×256 image points, an operation is thus possible without further techniques with conventional computers. Give larger image formats it is not possible to execute this in a short time span even with powerful personal computers. In any case, this method in frequency space cannot be used to simultaneously interpolate and filter images in real time. The general principles of Fourier transformation on which this method is based are explained on page 108 in IWAINSKY A., WILHELMI W., Lexikon der Computergrafik und Bildverarbeitung, Vieweg Verlagsgesellschaft, 1994.

SUMMARY

It is an object to achieve a method for changing the resolution and correction of a digital image that is not subject to the disadvantages described above and can simultaneously be executed very simply and quickly, such that it can also be realized in a simple, cost-effective hardware circuit.

In a method or device for interpolation and correction of a digital image, the source image is mapped to a target image with a FIR filter that comprises a plurality of filter coefficients, the filter coefficients comprising both information for interpolation and information for correction of the image. Both the interpolation and the correction of the image are executed in a single step.

BRIEF DESCRIPTION OF THE DRAWINGS

FIG. 3 shows a table that respectively comprises in each row a set of filter coefficients for a FIR filter, whereby the filters are provided for a respectively different shift or interpolation;

FIGS. 8a, 8b through 16a, 16b respectively show the curve of the amplitude or of each phase for the shift of dx=0, or 0.125, or 0.25, or 0.375, or 0.5, or 0.625, or 0.75, or 0.875, or 1;

DESCRIPTION OF THE PREFERRED EMBODIMENT

Figures 1, 2:
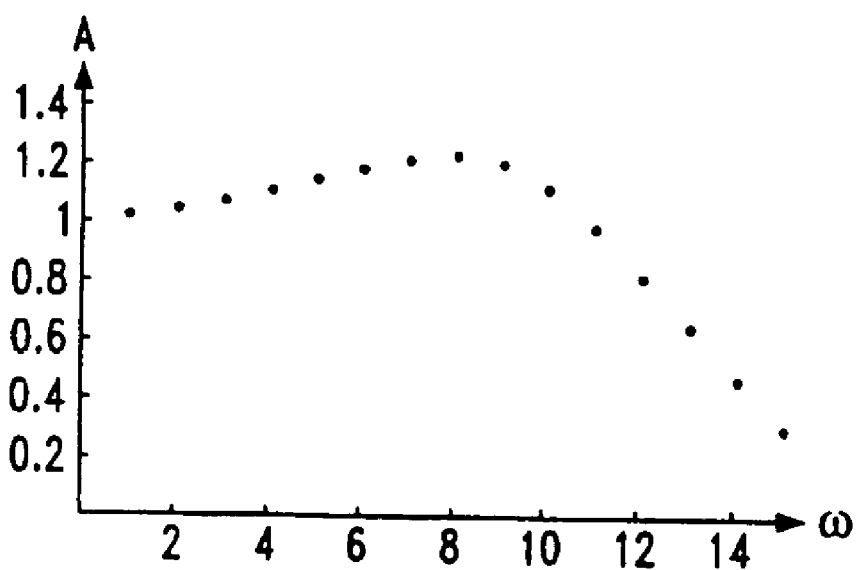
FIG. 1 shows schematically, the mapping of an image point of the source image to a target image by means of a filter calculation corresponding to a mathematical folding.
FIG. 2 is an exemplary transfer function for correction of a scanned digital image.
Figure 4:
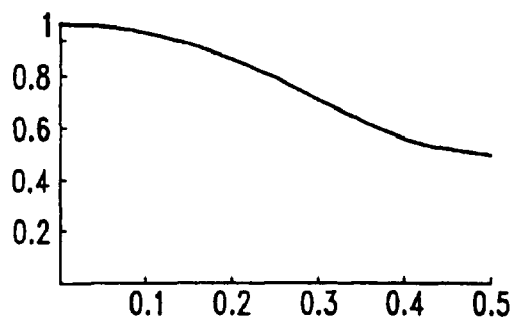
FIG. 4 shows the curve of the amplitude given a conventional bilinear interpolation for a shift of dx=0.25.
Figure 5:
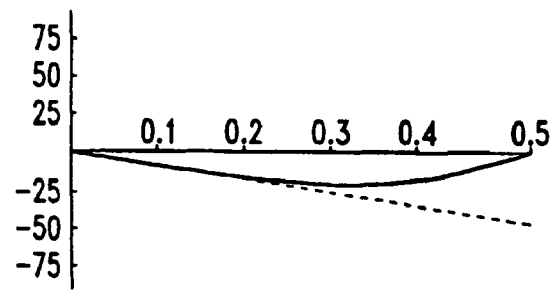
FIG. 5 is the curve of the phase for a shift of dx=0.25 for a conventional bilinear interpolation.
Figure 6:
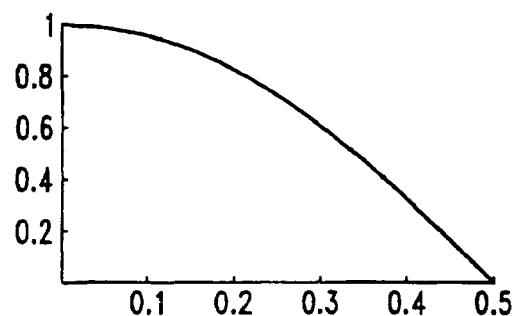
FIG. 6 shows the curve of the amplitude for a shift of dx=0.5 for a conventional bilinear interpolation.
Figure 7:
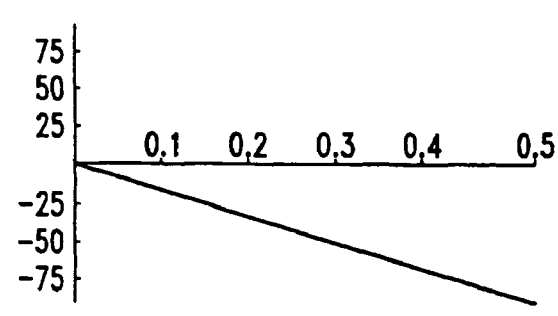
FIG. 7 illustrates the curve of the phase for a shift of dx=0.5 for a conventional bilinear interpolation.
Figure 8A:
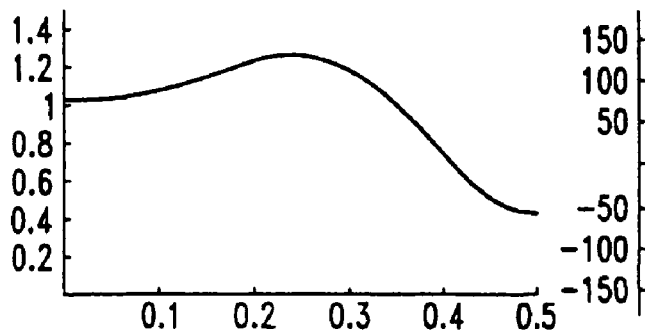
Figure 8B:
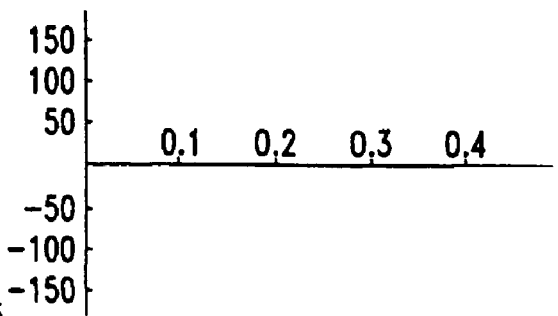
Figure 9A:
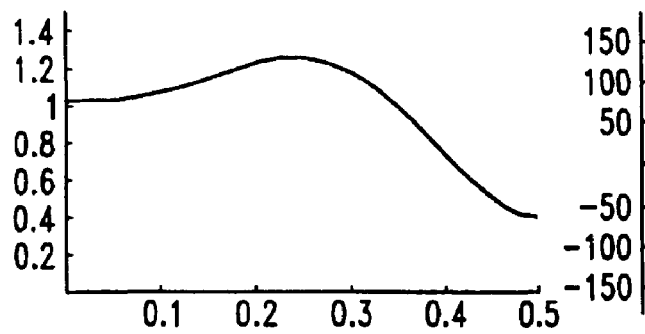
Figure 9B:
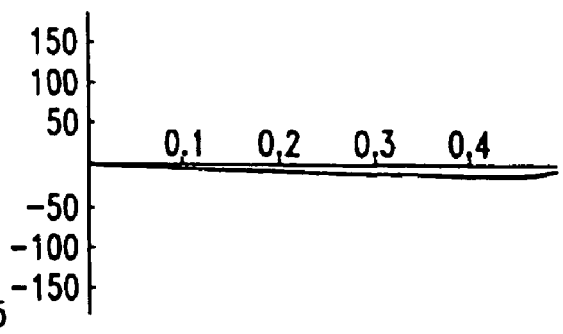
Figure 10A:
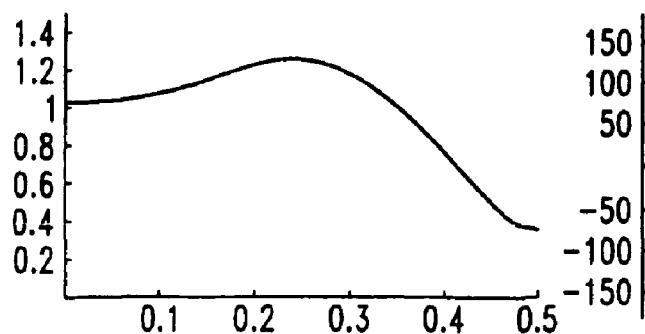
Figure 10B:
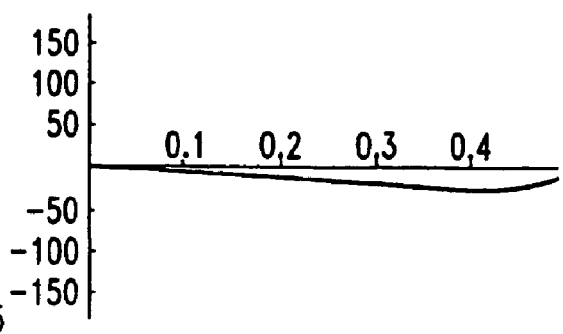
Figure 14A:
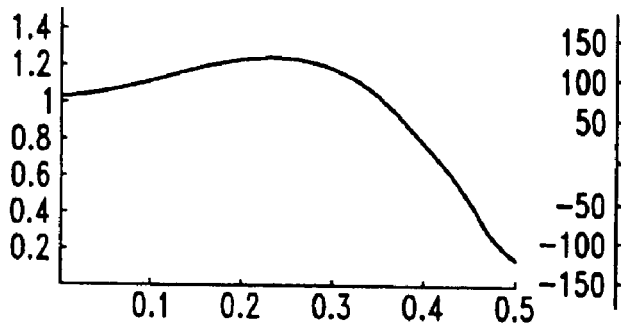
Figure 14B:
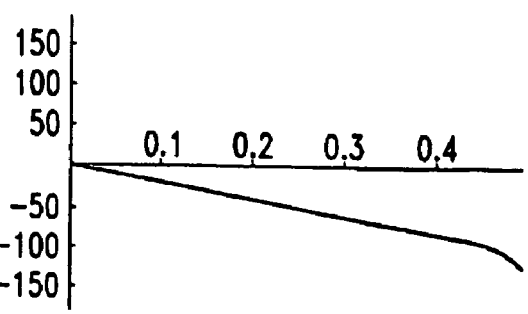
Figure 15A:
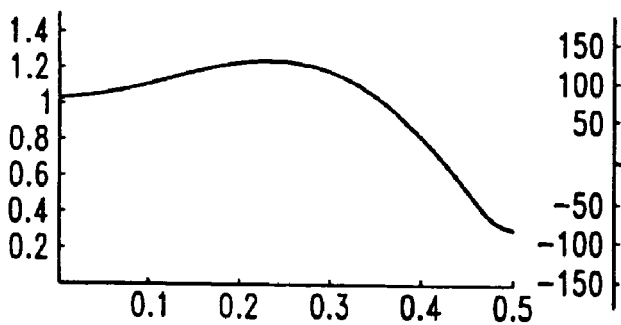
Figure 15B:
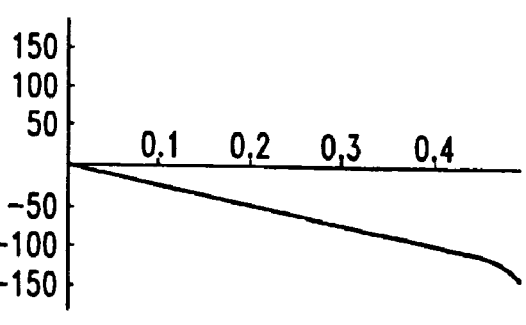
Figure 16A:
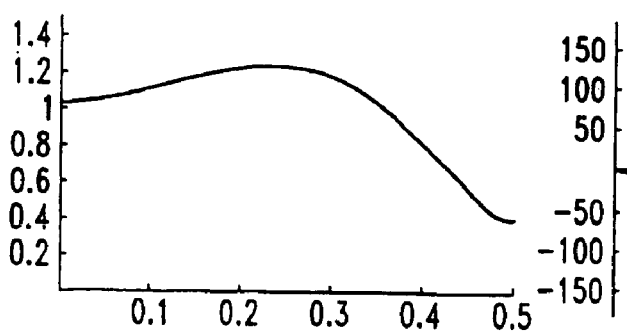
Figure 16B:
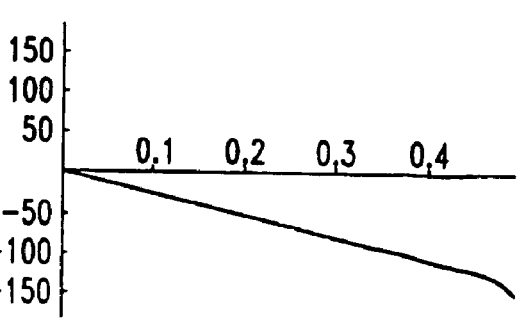

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

According to the method of the preferred embodiment for interpolation of a digital image, a source image is mapped to a target image with a FIR filter that comprises a plurality of filter coefficients. The filter coefficients comprise information both for interpolation and for correction of the image, such that both the interpolation and the correction of the image are executed in a single step.

Since, according to the preferred embodiment, a single filter is used with which both an interpolation for changing the resolution and a correction are executed in one step, all original information for both the changing of the resolution and for the frequency correction are present and enter into the calculation, such that no subsequent errors occur as they are known from the conventional methods. This applies to errors due to the interpolation and rounding errors.

Via the use of an FIR filter the calculations in conventional three-dimensional space can occur in a direction along horizontal or vertical lines of the image since FIR filters are separable. This allows both a very fast execution of the method with a software solution and a simple and cost-effective hardware implementation.

The method of the preferred embodiment can be realized simply as a hardware circuit.

The preferred embodiment is based on the following facts:

In image processing filters do not need to be causal. This has the result that amplitude and phase can be adjusted independent of one another.

A linear, discrete FIR filter ("Digitale Bildverarbeitung", 4th edition, Bernd Jähne—ISBN 3-540-61379-x, chapter 4 neighborhood operators) is used with the preferred embodiment. The individual image points of the target image are calculated row by row from the image points of the source image, whereby a specific number of image points of the source image enter into the filter calculation corresponding to a mathematical folding, which image points are arranged symmetrically around the corresponding image point of the source image that corresponds to the image point to be calculated of the target image. This is described with the following formula:

$$G'_{mn} = \sum_{i=-r}^{r} a_i G'_{m,n-1} \qquad (1)$$

whereby $G'_{mn}$ is the mapping point G' in the n-th column and m-th row, $G_{mn}$ is the image point of the source image in the n-th column and m-th row and $a_i$ is the filter coefficients. This is schematically shown in FIG. 1, whereby a point $G_{mn}$ of a source image is mapped to a point $G'_{mn}$ in the target image by means of a filter with three coefficients $a_i$.

The essence of the preferred embodiment is that the filter coefficients $a_i$ are selected such that they effect both an interpolation and a correction of the frequency response of the image in one calculation step. Only one filter is thus used in order to implement the interpolation and frequency correction.

The calculation of the filter coefficients $a_i$ is subsequently explained in detail. For this one ideally begins from a continuous transfer function $H(\omega)$. The transfer function $H(\omega)$ serves for correction of the frequency response given the mapping of the source image to the target image. This transfer function is approximately replaced by a transfer function of the discrete Fourier transformation $\tilde{H}(\omega)$:

$$H(\omega) \approx \tilde{H}(\omega) \qquad (2)$$

In conventional three-dimensional space the source image is described in one line by the continuous function f(x). Given a sub-pixel shift dx, i.e. given a shift by a distance dx that is smaller than the interval of two adjacent image points, the function in conventional three-dimensional space reads f(x+dx). The transition from conventional three-dimensional space into frequency space by means of Fourier transformation can be represented as follows:

$$f(x+dx) \xrightarrow{Fourier} e^{i\omega dx} F(\omega) \qquad (3)$$

whereby $F(\omega)$ is the function of f(x) transformed into frequency space. This means that a sub-pixel shift in frequency space can be represented as a phase shift by the phase $i\omega dx$ and this phase shift or sub-pixel shift is represented as a product of the non-shifted function $F(\omega)$ and the phase coefficient $e^{i\omega dx}$. This phase or sub-pixel shift forms an interpolation since the value between two image points is hereby determined. For the transfer function this therefore has the result that it must merely be multiplied with the phase components to show the interpolation:

$$H_{dx}(\omega) = H(\omega) \cdot e^{i\omega dx} \quad (4)$$

This formula makes the embodiment of the invention significantly easier since it shows that in frequency space the transfer function $H(\omega)$ and the phase shift or interpolation $e^{i\omega dx}$ are two independent factors of a product that can be determined independent of one another.

The transfer function of the FIR filter $H_{FIR}$ can be represented in frequency space as follows by means of a Fourier series:

$$H_{FIR} = \sum_{n=1}^{m} a_n e^{-i\omega n} \quad (5)$$

The coefficients $a_n$ of the Fourier series according to formula (5) correspond to the filter coefficients $a_i$ for formula (1). This means that the filter coefficients of the formula (1) can be calculated for a specific transfer function that is freely selectable and that, according to the formula (4), is multiplied with a phase component; the filter coefficients of the formula (1) can be calculated for a specific transfer function and a specific interpolation. Sets of filter coefficients can thus be calculated whose application respectively effect a specific frequency correction and interpolation.

The goal is therefore that an is to be determined such that the deviation from $(H_{FIR} - H_{dx}(\omega))$ is minimal. This correlation is required for k discrete spatial frequencies of the transfer function $H(\omega)$.

$$H(\omega_1) = \sum_{n=1}^{m} a_n e^{-i\omega n} \quad (6)$$

$$H(\omega_2) = \sum_{n=1}^{m} a_n e^{-i\omega n}$$

$$H(\omega_3) = \sum_{n=1}^{m} a_n e^{-i\omega n}$$

$$\vdots$$

$$H(\omega_k) = \sum_{n=1}^{m} a_n e^{-i\omega n}$$

In a matrix formulation with n=7 coefficients and k=9 discrete spatial frequencies, this results as:

$$\begin{bmatrix} e^{-i\omega_1} & e^{-2i\omega_1} & e^{-3i\omega_1} & e^{-4i\omega_1} & e^{-5i\omega_1} & e^{-6i\omega_1} & e^{-7i\omega_1} \\ e^{-i\omega_2} & e^{-2i\omega_2} & e^{-3i\omega_2} & e^{-4i\omega_2} & e^{-5i\omega_2} & e^{-6i\omega_2} & e^{-7i\omega_2} \\ e^{-i\omega_3} & e^{-2i\omega_3} & e^{-3i\omega_3} & e^{-4i\omega_3} & e^{-5i\omega_3} & e^{-6i\omega_3} & e^{-7i\omega_3} \\ e^{-i\omega_4} & e^{-2i\omega_4} & e^{-3i\omega_4} & e^{-4i\omega_4} & e^{-5i\omega_4} & e^{-6i\omega_4} & e^{-7i\omega_4} \\ e^{-i\omega_5} & e^{-2i\omega_5} & e^{-3i\omega_5} & e^{-4i\omega_5} & e^{-5i\omega_5} & e^{-6i\omega_5} & e^{-7i\omega_5} \\ e^{-i\omega_6} & e^{-2i\omega_6} & e^{-3i\omega_6} & e^{-4i\omega_6} & e^{-5i\omega_6} & e^{-6i\omega_6} & e^{-7i\omega_6} \\ e^{-i\omega_7} & e^{-2i\omega_7} & e^{-3i\omega_7} & e^{-4i\omega_7} & e^{-5i\omega_7} & e^{-6i\omega_7} & e^{-7i\omega_7} \\ e^{-i\omega_8} & e^{-2i\omega_8} & e^{-3i\omega_8} & e^{-4i\omega_8} & e^{-5i\omega_8} & e^{-6i\omega_8} & e^{-7i\omega_8} \\ e^{-i\omega_9} & e^{-2i\omega_9} & e^{-3i\omega_9} & e^{-4i\omega_9} & e^{-5i\omega_9} & e^{-6i\omega_9} & e^{-7i\omega_9} \end{bmatrix} * \begin{pmatrix} a_1 \\ a_2 \\ a_3 \\ a_4 \\ a_5 \\ a_6 \\ a_7 \end{pmatrix} \cong \quad (7)$$

$$\begin{pmatrix} H(\omega_1) \\ H(\omega_2) \\ H(\omega_3) \\ H(\omega_4) \\ H(\omega_5) \\ H(\omega_6) \\ H(\omega_7) \\ H(\omega_8) \\ H(\omega_9) \end{pmatrix}$$

In order to find the solution vector $a_n$, this system must be solved with the complex matrix elements $e^{-i\omega_x}$.

This leads to a special problem of the linear optimization that is known as "Quadratically Constrained Quadratic program". The coefficients then yield a transfer function that behaves like Tscebyscheff filters.

A collection of solution strategies is specified in the CORC Report TR-2002-04, "Robust convex quadratically constrained programs" by Goldfarb D. and Iyengar G. This report is available on the Internet at:

http://www.gsb.stanford.efu/facseminars/events/oit/pdfs/ lyengar_Ro bust.pdf

An exemplary embodiment of FIR interpolation field for n=7 coefficients and k=15 discrete spatial frequencies is subsequently explained.

The frequency correction can exemplarily be designed such that a superelevation of the frequency response in the range of half of the Nyquist frequency is aimed for. The superelevation is represented as a Gaussian curve. The superelevation amounts to, for example, 25%. An ideal interpolation filter has the amplification of 0 at the Nyquist frequency. The transition to this is achieved via a Kaiser window. The transfer function results from the combination of these functions.

Such a frequency correction allows for the fact that many optical systems as a rule map higher frequencies (i.e. contrasts of very closely neighboring points or lines (fine contrasts)) more poorly than lower frequencies (i.e. contrasts of larger points or wider lines (rougher contrasts)). The amplification is therefore somewhat elevated up to half of the Nyquist frequency.

The curve of this transfer function (absolute value function) with which the frequency correction is executed is shown in FIG. 2, whereby the 15 discrete spatial frequencies of $\omega$ are plotted normalized on the abscissa and the amplification factor A is shown on the ordinate. The discrete spatial frequencies are selected such that the maximum value of 15 corresponds to the Nyquist frequency, whereby the maximum in the coordinate system is shown at 7.5 (half of the Nyquist frequency).

In other optical systems with different optical properties, it can naturally be appropriate to design the transfer function correcting the frequency response differently.

Since the transfer function explained in the preceding comprises only the frequency correction, it must still be multiplied with the phase components $e^{i\omega dx}$ for execution of the interpolation (see formula (4)). For this the phase components are calculated for the 15 discrete spatial frequencies and for respectively 10 shifts of 0×d, 0.1×d, 0.2×d, . . . , 0.9×d, whereby d is the separation of two adjacent image points in the source image. A set of phase components for the 15 discrete spatial frequencies was thus calculated and multiplied with the transfer function for each possible shift in the raster of 0.1 d.

The values hereby resulting for a predetermined shift dx thus yield the vector $H_{dx}(\omega)$ on the right side in the formula (7).

An equation system according to the formula (7) was thus assembled for each of the 10 shifts dx.

The 10 equation systems for determination of the 10 solution systems an were calculated by means of the method addressed above for linear optimization. By means of these multiple equation systems the interpolation can be elegantly integrated into the filter coefficients of the FIR filter acting in conventional three-dimensional space for each interpolation step.

The values of the filter coefficients $a_n$ hereby resulting are specified in the table shown in FIG. 3, whereby 7 filter coefficients for an FIR filter are respectively listed for a predetermined shift dx in each row. According to the formula (1) and FIG. 1, given a shift by the value dx=0 (thus no shift in the general usage) with the interpolation an image point in the target image is calculated whose location corresponds to the image point in the source image that is multiplied with the coefficient $a_4$. As can be recognized using the table from FIG. 3, given a shift dx=0 the coefficient $a_4$ is 1.00169, such that this value from the source image enters very strongly into the corresponding value of the target image. Given a shift of dx=0.9, the location of the image point to be calculated in the target image is, however, displaced (due to the shift of 0.9 times the separation of two adjacent image points) from the image point that is multiplied with the coefficient $a_4$ in the direction towards the image point that is multiplied with the coefficient $a_5$. Using the table from FIG. 3 one recognizes that, given a shift of dx=0.9, the coefficient $a_4$ is merely 0.233042 and the coefficient $a_5$ is contrarily 0.990426. This means that the image point whose location in the source image lies closer to the corresponding location in the target image and which is multiplied with the coefficient $a_5$ enters significantly more strongly into the calculation than the rather farther image point that is multiplied with the coefficient $a_4$. The coefficients $a_4$ thus reduce in stages with larger displacement, whereby the coefficients $a_5$ increase with increasing displacement in a corresponding manner. From this one can graphically follow the interpolation effect of the calculated filter.

Since the filter coefficients that comprise both the information regarding frequency correction and that regarding interpolation can be simply calculated with a pre-designated method, it is possible to vary the transfer function given a specific application and to correspondingly calculate different filter coefficients. This is, for example, reasonable when a zoom objective is used with which are to be associated different transfer functions given different focal widths. Depending on the adjustment of the focal width, filter coefficients are accordingly calculated with a correspondingly-adapted transfer function.

As is explained above, other transfer functions correcting the frequency response can also be used. A very advantageous transfer function is subsequently explained using FIGS. 18a and 18b.

Since upon scanning the image to be sampled does not lie exactly in the focus of the objective of the scanner, a blurring arises that is described by the following blurring transfer function $h1(\omega)$ (FIG. 18a):

$$h1(\omega) = (6.00357 \cdot \text{Bessel function of the 1st order} (0.33313 \cdot 16 \cdot x))/(16x) \quad (8)$$

Since the image points possess a finite size, at high frequencies blurs are generated that are described by the following aperture transfer function $hs(\omega)$:

$$h2(\omega) = \frac{\sin(\pi \cdot x)}{\pi \cdot x} \quad (9)$$

Figure 18A:
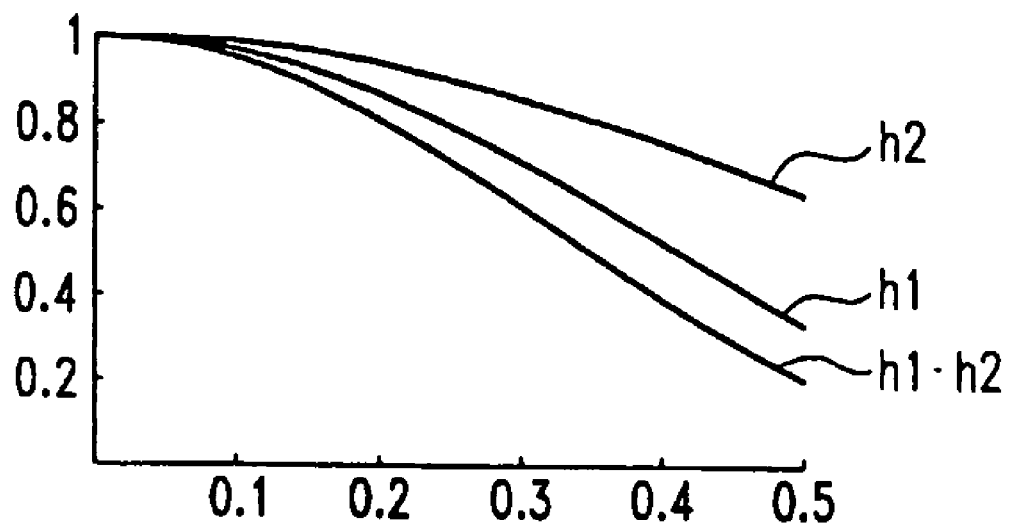
FIGS. 18a, 18b show a further transfer function correcting the frequency response as well as components of the transfer function.

The entire blurring is described by the product $p(\omega)$ of $h1(\omega)$ and $h2(\omega)$ that is shown in FIG. 18a.

The transfer function correcting the frequency response would be calculated in a first approach as the reciprocal of the product $p(\omega)$. However, in particular given high w a significant noise would be caused since this function would rise enormously.

An optimal filter is to be drawn from the transfer functions $h1(\omega)$ and $h2(\omega)$ explained above for calculation of a Wiener filter, which optimal filter corresponds to the following formula:

$$H(\omega) = \frac{h1(\omega)^2 \cdot p(\omega)}{h1(\omega)^2 \cdot p(\omega)^2 + 0.04} \quad (10)$$

Figure 18B:
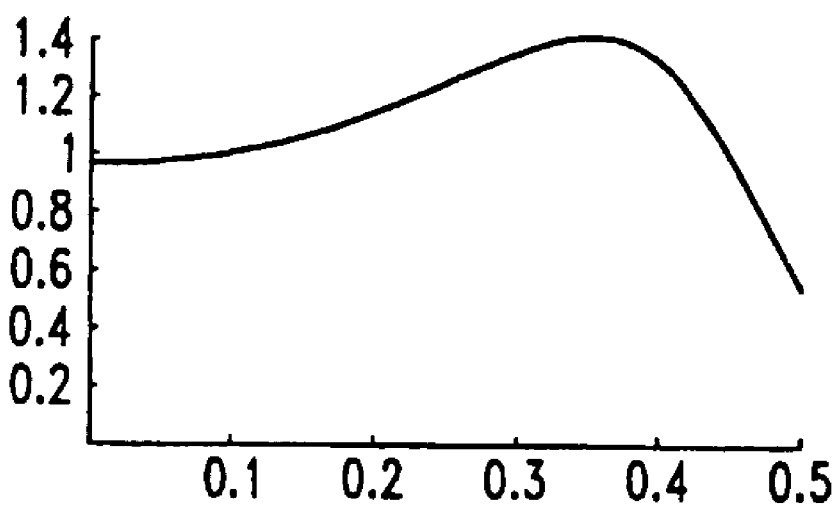

This transfer function correcting the frequency response is shown in FIG. 18b and can be used (similar to the transfer function shown in FIG. 2) for generation of the filter coefficients of the FIR filter of the preferred embodiment. In FIGS. 18a, 18b the transfer functions are normalized to the maximum wave number of the system, whereby 0.5 corresponds to the Nyquist frequency.

Figure 17:
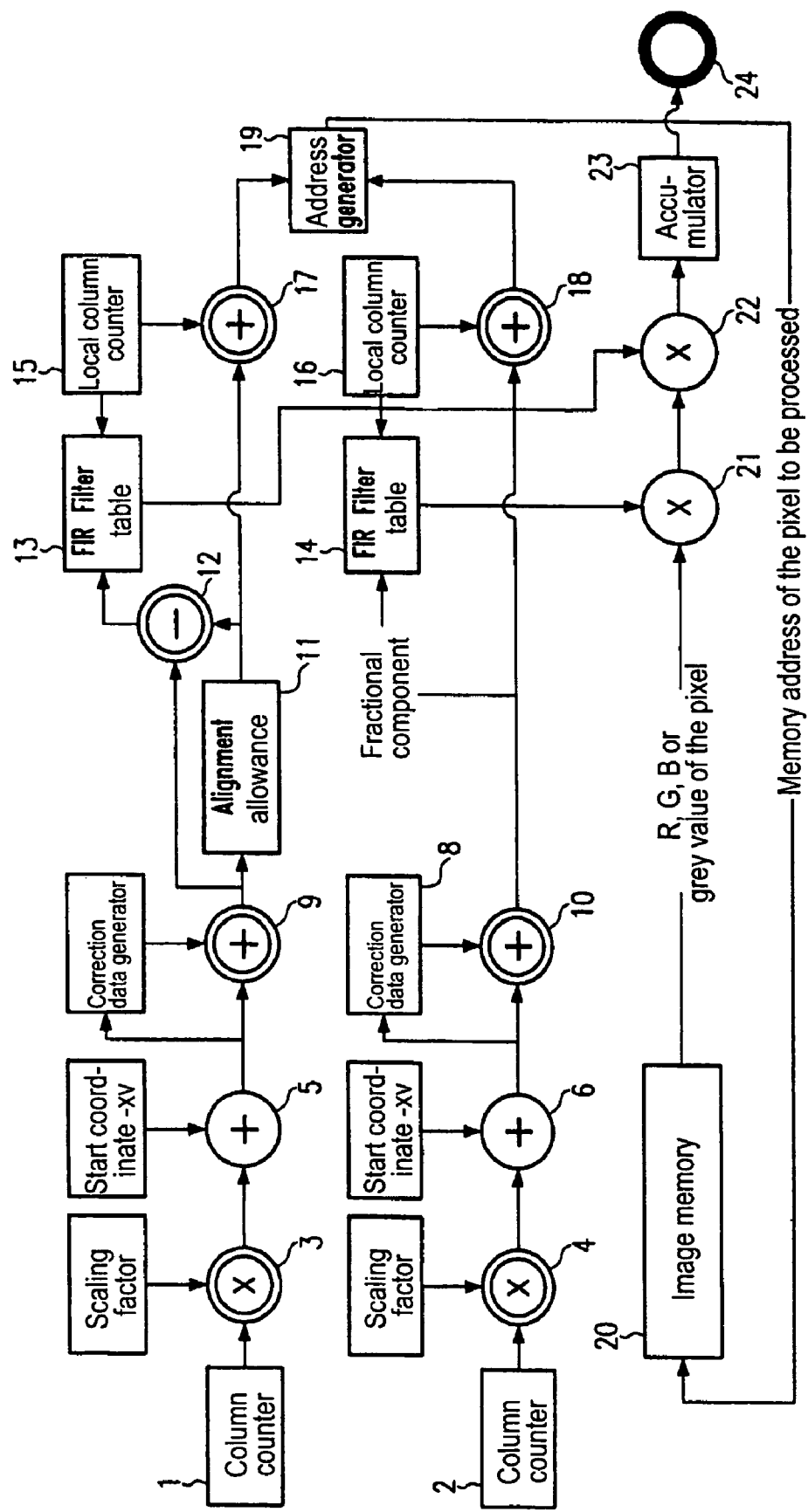
FIG. 17 shows schematically, a block diagram of a device for execution of a method of the preferred embodiment.

A device for execution of the of the preferred embodiment method is schematically shown in a block diagram in FIG. 17.

This device comprises a column counter 1 and a row counter 2. The column counter 1 counts the columns in the target image and the row counter 2 counts the rows in the target image. When the column counter 1 has counted through all columns in the target image once, the row counter counts one row further. The image points of the target image are thus counted through row by row in succession. These two counters 1, 2 thus provide for which image point in the target image the mapping from the source image should be executed.

A multiplier 3, 4 with which the column count or the row count are multiplied with a corresponding scaling factor is respectively downstream from the column counter 1 and the row counter 2. The scaling factor represents the step width in the source image, such that the separation of two image points in the target image (i.e. the distance between two adjacent columns or rows) is mapped to the source image in the unit of the separation of two adjacent image points in the source image.

Adders 5, 6 that add a start coordinate to the respective column or row number are respectively downstream from the multipliers 3, 4. On the one hand the image section in the source image that should be mapped to the target image is established with this start coordinate. On the other hand, the start coordinate centers the FIR filter on the respective image point in the source image, which is explained in detail below.

The column and row numbers so corrected are respectively supplied to a correction data generator 7, 8 and to an adder 9, 10. The correction data generators 7, 8 calculate from the supplied column number and row number a correction value (which, for example, corrects the distortion error that is caused by usage of a specific optic given the generation of the source image) using a predetermined function or a look-up table. This correction value is supplied to the respective adder 9, 10 and added with the corresponding column number or row number. The column and row number so obtained specifies the coordinate in the source image from which the FIR filter (explained above) can calculate for calculation of the image point of the target image with the column and row number predetermined by the column counter 1 and row counter 2.

An element for alignment correction 11 and, in a branching, a subtracter 12 follows the adder 9. The element for alignment correction 11 and the subtracter 12 are initially not taken into account in the explanation of the inventive device. Via this branching (which leads to a FIR filter table 13), the FIR filter table 13 is supplied to the fractional component of the column number.

In a corresponding manner a FIR filter table 14 to which is supplied the fractional component of the row number is arranged after the adder 10. The whole-number portion of the column number or of the row number are supplied to an adder 17 or 18. A local column counter 15 or a local row counter 17 are respectively interconnected between the adders 17, 18 and the FIR filter tables 13, 14. Given application of a specific column or row number to the adder 17, 18, the local column counter 17 and the local row counter 17 respectively count from 0 to n−1, whereby n is the number of the filter coefficients. The counter number i of the local column counter 15 is relayed to the FIR filter table 13 and accordingly (i+I-th filter value) the corresponding filter value is selected from the second fractional component of corresponding filters. The filter values are selected in a corresponding manner in the FIR filter table 14 dependent on the fractional component and the counter value of the local row counter 16. The counter value of the local column counter 15 is added to the whole-number column number at the adder 17, whereby the column number corresponding to the corresponding filter value is calculated. The counter value of the local row counter 16 is added in a corresponding manner to the whole-number row number supplied to the adder 18. An output value of the adder 17 (column number) and an output value of the adder 18 (row number) respectively form a coordinate pair that is supplied to an address generator 19. In the address generator 19 these coordinates are translated into corresponding address data that specify the addresses in an image memory 20. The image memory 20 comprises the data of the source image and the addresses generated by the address generator 19 contain in the image memory the data of the source image that correspond to the coordinate pairs supplied to the address generator 19. The corresponding values are then read out from the image memory, initially to a first multiplier 21 multiplied with the filter values from the FIR filter table 14 and then to a second multiplier 22 multiplied with the filter values from the FIR filter table 13. For calculation of an image point the local column counter 15 is run through once for each step in the local row counter 16, meaning that after each cycle of the local column counter 15 the local row counter 16 is increased by one. The values hereby determined are added up in an accumulator 23 and then output as a value of the image point in the target image that is defined by the column number provided by the column counter 1 and the row number provided by the row counter 2.

After output of a corresponding image value the column counter is increased by 1 and a new image value is calculated, whereby the local column counter 15 and the local row counter 16 run through their value range once.

If the column counter has arrived at the last column, it is reset to 0 and begins with the first column and the row counter is increased by 1. If both the column counter and the row counter have arrived at their maximum values, the entire target image is calculated.

Since FIR filters are separable, the filter calculations of the preferred embodiment can be executed simultaneously both in the column direction and in the row direction and be superimposed at the first and second multipliers 21, 22 via successive multiplication.

The property of calculators, that they normally operate with data words comprising 32 bits although, only 8 bits are required to describe an image point, can be utilized with the element for alignment correction explained above. The values of four image points can thus be retrieved with one access with the reading of one data word. The element for alignment correction takes this into account and sets the column number such that the next smallest address divisible by 4 is present at the address generator 19. This truncation has the effect of a shift to the left.

This shift could be cancelled again by a corresponding multiplexer device that compensates this shift again. However, it is more elegant to process this whole-number shift together with the sub-pixel shift in the filter and to compensate with the FIR filter table present anyway. For this the differentiator 12 generates the difference between the column number present at the address generator 19 and the column number output by the adder 9. The difference then yields the sum of a whole-number shift and the sub-pixel shift formed by the fractional component. Not only the sub-pixel shift but rather also the shift by a plurality of image points corresponding to the rounding of the memory access address is thus executed with the filter.

The device described above using FIG. 17 is a hardware circuit for mapping of a source image onto a target image. This hardware circuit is designed from simple standard components, which is why it can be produced cost-effectively. It additionally allows a very fast mapping of the source image onto the target image.

The preferred embodiment can naturally also be realized by a data processing program that is executed on a corresponding microprocessor.

The preferred embodiment method is provided for application in a scanner, in particular in a high-capacity scanner with which up to 100 sheets of DIN A4 per minute can be scanned, interpolated and corresponding transfer functions can be corrected.

The principle of the preferred embodiment can also be used in other application fields such as, for example, in digital photo apparatuses.

The preferred embodiment can be briefly summarized according to the following:

The preferred embodiment concerns a method and device for interpolation and correction of a digital image. A source image is hereby mapped to a target image with a FIR filter that comprises a plurality of filter coefficients. The filter coefficients comprise both the information for interpolation and that for correction of the image, such that both the interpolation and the correction are executed in a single work step.

The method of the preferred embodiment for mapping of the source image to the target image can be realized simply with a hardware circuit, such that the mapping is executed in a device (in particular in a scanner) without delay of the overall process workflow.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for interpolation and correction of a digital image, comprising the steps of:
mapping a source image to a target image with a FIR filter that comprises a plurality of filter coefficients, the filter coefficients comprising both information for interpolation and information for correction of the image; and
executing both the interpolation and the correction of the image in a single step.

2. A method according to claim 1 wherein before the mapping of the source image to the target image in filter coefficients with k discrete spatial frequencies are calculated according to the following formula:

$$\begin{bmatrix} e^{-i\omega_1} & e^{-2i\omega_1} & \cdots & \cdots & \cdots & e^{-ni\omega_1} \\ e^{-i\omega_2} & e^{-2i\omega_2} & & & & e^{-ni\omega_2} \\ \vdots & & \ddots & & & \vdots \\ \vdots & & & \vdots & \vdots & \vdots \\ \vdots & & & \vdots & \vdots & \vdots \\ & & \ddots & & \ddots & \\ e^{-i\omega_k} & e^{-2i\omega_k} & \cdots & \cdots & \cdots & e^{-ni\omega_k} \end{bmatrix} * \begin{pmatrix} a_1 \\ a_2 \\ \vdots \\ \vdots \\ \vdots \\ a_n \end{pmatrix} \cong \begin{pmatrix} H(\omega_1) \\ H(\omega_2) \\ \vdots \\ \vdots \\ \vdots \\ H(\omega_k) \end{pmatrix},$$

where $a_1$ through $a_n$ are the filter coefficients and $H(\omega_e)$ is a transfer function multiplied with a phase component for a respective spatial frequency $\omega_1$.

3. A method according to claim 1 wherein a plurality of sets of filter coefficients are calculated for one respective predetermined shift.

4. A method according to claim 1 wherein the predetermined shifts for which respectively one set of filter coefficients is calculated comprise all shifts between 0 and a separation of two adjacent pixels in the source image as well as uniformly spaced intermediate steps.

5. A method according to claim 2 wherein a transfer function is used whose frequency response is increased in a range of half of a Nyquist frequency.

6. A method according to claim 5 wherein a superelevation exhibits a Gaussian curve and amounts to 15 to 30%.

7. A method according to claim 1 wherein it is used in an optical scanning device that comprises an objective for optical scanning of a document, where transfer functions are varied dependent on a setting of the objective.

8. A device for interpolation and correction of a digital image, comprising:
means for mapping a source image to a target image, said means comprising an FIR filter that comprises a plurality of filter coefficients, the filter coefficients comprising both information for interpolation and information for correction of the image;
means for calculation of a filter coefficient; and
said means for mapping executing the interpolation and correction of the image in a single step.

9. A device according to claim 8 wherein the means for mapping the source image to the target image is designed as a hardware circuit, comprising
a column counter, downstream from which is a multiplier for multiplication of a column number with a scaling factor,
a row counter downstream from which is a multiplier for multiplication with a scalling factor,
correction means for the column number and row number,
a FIR filter table associated with the column number,
a FIR filter table associated with the row number,
a local column counter a value of which is used for reading out a corresponding filter coefficient from the FIR filter table and the value of which is added to the column number by means of an adder,
a local row counter a value of which is used to read out the filter coefficient of the FIR and the value of which is added to the row number by means of an adder,
an address generator that generates an address for the image memory using the column/row number corrected and supplemented by the local column counter or local row counter, at which address is stored the source image,
two multipliers that multiply a value of the image point provided by the address generator generated address with the filter coefficients, and
an accumulator that adds up all image values multiplied with the filter coefficients for a pass of a local column counter for each value of a local row counter.

10. A device according to claim 8 further comprising a microprocessor in which a data processing program is provided.

11. A device according to claim 8 further comprising a microprocessor, and wherein a data processing program for calculation of the filter coefficients is stored and can be executed with the microprocessor.

12. A device according to claim 8 further comprising a scanner.

* * * * *